United States Patent [19]

Milberger et al.

[11] 4,193,032
[45] Mar. 11, 1980

[54] HIGH SPEED TRANSMITTER PULSER

[75] Inventors: Walter E. Milberger, Serverna Park; Larry G. Wright, Pasadena, both of Md.

[73] Assignee: The United States of America as represented by the Secretary of the Air Force, Washington, D.C.

[21] Appl. No.: 826,057

[22] Filed: May 8, 1969

[51] Int. Cl.² ............................................. G01S 7/38
[52] U.S. Cl. ..................................... 178/116; 375/68; 343/18 E
[58] Field of Search .............. 343/18 E; 325/104, 120, 325/132, 150, 169

[56] References Cited

U.S. PATENT DOCUMENTS

| | | |
|---|---|---|
| 3,891,989 | 6/1975 | Barney et al. ...................... 343/18 E |
| 3,909,828 | 9/1975 | Israel et al. ........................ 343/18 E |
| 4,037,227 | 7/1977 | Kline ................................... 343/18 E |

Primary Examiner—T. H. Tubbesing
Attorney, Agent, or Firm—Joseph E. Rusz; George Fine

[57] ABSTRACT

An apparatus for pulsing a high speed transmitter having pulser delay times in the nanosecond range. The combination of solid state and spark gap devices provide protection against high voltage arcs for both transient and power follow-through conditions.

6 Claims, 1 Drawing Figure

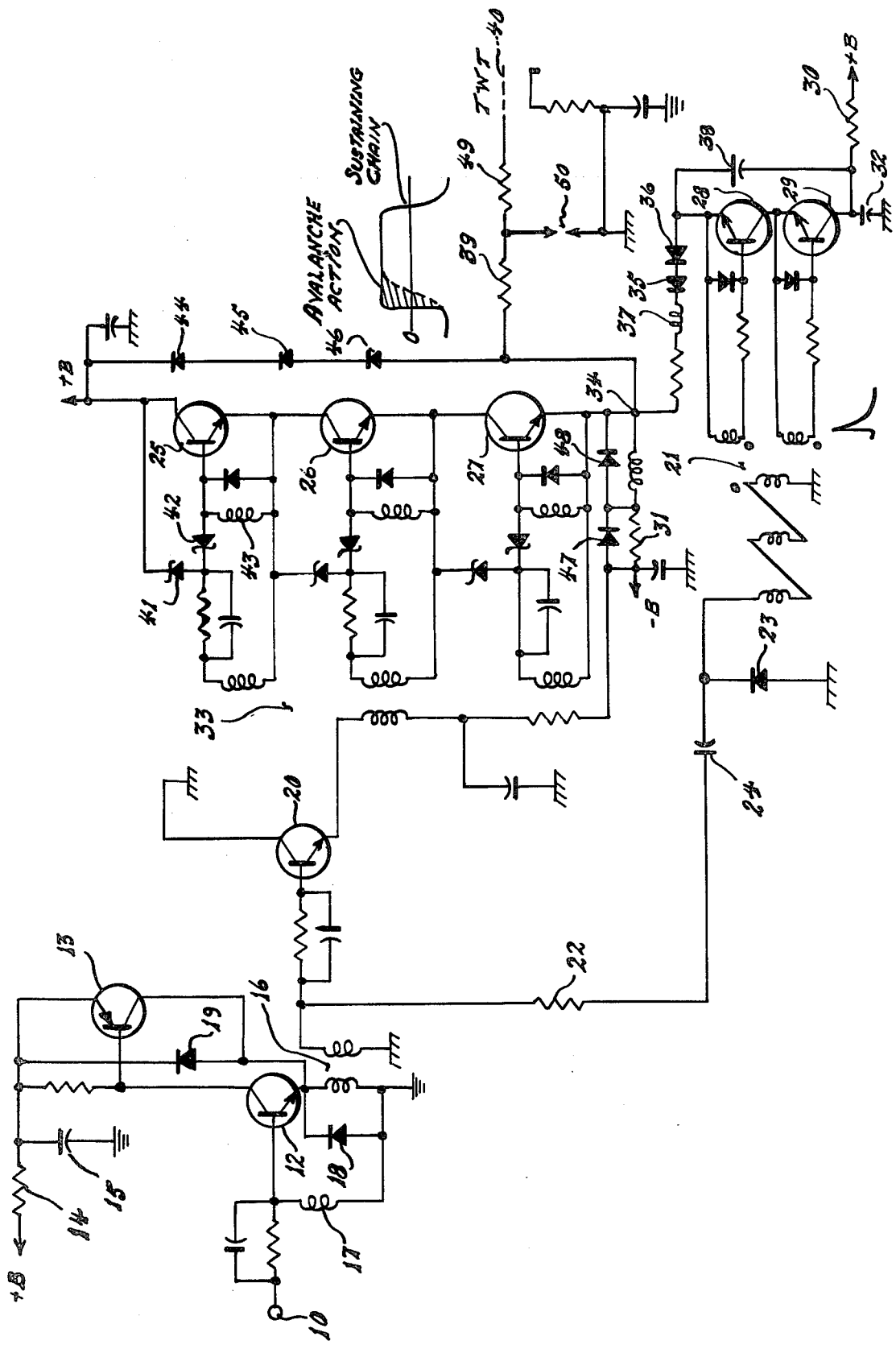

HIGH SPEED TRANSMITTER PULSER

BACKGROUND OF THE INVENTION

In order to effectively compromise sophisticated radar tracking receivers, electronic jamming devices must decrease their transponder response time to enable them to capture the receiver range gate. In the prior art electronic jamming devices, substantially all the delay in their transponder response time was attributable to the jammer's transmitter pulser. Response time delays of the order of 150–300 nanoseconds or greater were common. This was true for hard tube, soft tube and solid state pulser designs. Through the application of novel device with the unique circuit arrangement described herewithin, the pulser delay time has been substantially reduced to the order of 20 nanoseconds.

SUMMARY OF THE INVENTION

The present invention provides an apparatus for pulsing a high speed transmitter having an extremely fast response time in the order of 20 nanoseconds and has many other unique characteristics heretofore not available. The coupling within the apparatus from the ground deck to the floating deck is done by a low capacitance, wideband transformer which likewise provides for steady state high voltage isolation. The pulse amplitude may be controlled over a wide range to within less than 1 percent. In addition to many other self-protection circuits, the pulser is fully protected against high voltage arcs for both transient and power follow through conditions.

These and other advantages, features and objects of the invention will become more apparent from the following description taken in connection with the illustrative embodiment in the accompanying drawing, wherein the FIGURE is the schematic diagram of the high speed transmitter pulser.

DESCRIPTION OF THE PREFERRED EMBODIMENTS

Referring now to the FIGURE, a low level positive pulse (12 volts) is applied to the input 10 of the complementary compound emitter follower which is comprised of transistors 12 and 13. The +B decoupling network which is comprised of resistor 14 and capacitor 15 protects the transistors 12, 13 against excessive current during pulse conditions when transformer 16 is not biased. The base input choke 17 of transistor 12 protects the stage against a DC input and, in addition, may be used to set the maximum pulse width limit.

Transformer 16 is a special wideband toroidal video 1 to 1 coupler. The ground to deck capacitance is 2 micro-micro farads. For a rise time of 10 nanoseconds the device is essentially flat out to 20 microseconds. The primary turns of transformer 16 are insulated to withstand a 20 kv steady state condition. The core material which is used may be orthonal, supermedur, or permalloy. The transformer 16, because of the unipolar transmission flux, must be supplied a counter bias to permit full loop swing. Even though the capacitive and magnetic coupling is small during high voltage arc conditions, diodes 18 and 19 are included to protect the driver circuit and its associated logic source.

The output positive pulse which is coupled by transformer 16 to the floating deck provides drive to transistor 20 which is operated as an emitter follower and also to transformer 21. The series resistor 22 isolates the action of clipper diode 23 and the differentiator which is comprised of capacitor 24 and the primary of transformer 21. Under quiescent conditions transistors 25, 26 and 27 are nonconducting. The avalanche transistors 28 and 29 are near or in the first avalanche level and when conduction occurs, it is from −B to +B through limiting resistor 30. The current limit is set by resistor 30 so as to just approach the knee of the first avalanche level (a few micro to one milliamp). The value of bias resistor 31 is low and thus, is always providing the bias requirements of the traveling wave tube (TWT).

Transistors 28 and 29 are triggered into their controlled second avalanche level during the leading edge of the pulse appearing at the secondary of transformer 16. This is accomplished by base matching transformer 21 which couples the pulse to the bases of transistors 28, 29. At this time storage capacitor 32 permits the TWT grid 40 to come up to full +B voltage with a 10 nanosecond rise. Following this action the sustaining transistor chain (transistors 25–27) is turned on via emitter follower transistor 20 and base matching transformer 33. This is the turn on delay which is inherent with conventional transistors pulser circuits. Thus, when transistors 25–27 turn on, the voltage appearing at point 34 rises above the avalanche supply voltage. This condition causes diodes 35 and 36 to become back biased, which in turn cuts off avalanche transistors 28 and 29. The sustaining chain henceforth maintains the TWT grid 40 at +B for the subsequent pulse duration. It should be noted that the condition stated above is insured since the set voltage of the avalanche devices are 10 volts each, whereas the drop across the sustaining chain is only 2 volts.

In order to accommodate a 2:1 range of +B voltage, the avalanche circuit employs resonant charging to extend its normal 20 percent limit. This is done by adding inductor 37 and capacitor 38. Capacitor 38 which comprises the rise of transistors 28, 29 to be compatible with the series resonant circuit is comprised of inductor 37 and the grid and stray capacitance appearing at point 34. The resistor 39 is required to lower the circuit Q and to prevent back triggering via path transformer 33, transistor 20 and transformer 21. The resonant rise time of the circuit is 12 nanoseconds.

The storage control of the sustaining chain (transistors 25–27) is maintained at 50–100 nanoseconds by nonlinear feedback. The zener 41 which is connected from the collector to base of each sustaining transistor serves two functions. First, it equalizes the collector to emitter voltage throughout the sustaining chain. Second, it conducts in the forward direction when the collector goes negative with respect to the cathode of zener 42. Thus saturation is prevented, thereby minimizing the storage time. The purpose of inductor 43, which is connected between the base to emitter of all sustaining transistors 25–27, is to maintain a low DC path, and to thereby permit the sustaining voltage to approach $V_{CBO}$.

System integrity is maintained even during high voltage arc conditions by a combination of solid state and spark gap devices. For the particular case tested, the TWT supply was a 10 joule source with a power follower through of 200 ma at 10 kilovolts. For the condition stated, an induced arc corresponding to a TWT grid to ground short was repeated 100 times without apparent pulser deterioration. Any positive going arcs transients which may occur at point 34 of figure are diverted to RF ground via the diode string consisting of diodes 44, 45 and 46. Any negative going transient sees a ground path through diodes 47 and 48. Commercially available diodes such as Fairchild IN3070 are one type of diode that may be used for diodes 47 and 48. These diodes are and should be capable of passing 500 amperes peak without a failure. The energy contained in the arc transient is dissipated in resistors 39 and 49. The purpose of spark gap 50 is to divert the discharge path from the diodes to the spark gap for power follow-through conditions. The location of resistor 39 is critical in order to prevent the oscillations which may occur during the spark gap firing from causing excessive dissipation in the IN3070 diode 47, 48 strings.

By utilizing additional series active devices, the high speed transmitter pulser may be modified to accommodate a wide range of voltage and load requirements. As described, the pulser apparatus provides a universal device. For higher power, the avalanche transistors may be replaced with SCR's to support a power transistor sustaining chain.

Although the invention has been described with reference to a particular embodiment, it will be understood to those skilled in the art that the invention is capable of a variety of alternative embodiments within the spirit and scope of the appended claims.

I claim:

1. In a high speed microwave transmitter apparatus having pulser delay times in the nanosecond range, a high speed pulser apparatus comprising in combination:
   a compound emitter follower means having an input and output, said compound emitter follower means receiving at said input a low level positive pulse input signal and providing at said output a signal having a leading edge,
   an avalanche control means normally biased at its first avalanche level, and upon receiving said outupt signal leading edge, providing a controlled second avalanche level,
   a traveling wave tube transmission means having a control grid, said controlled second avalanche level providing a bias signal which is applied to said control grid of said traveling wave tube transmission means, said bias signal turning on said transmitter traveling wave tube, and
   a sustaining chain means also receiving said output signal and providing a sustaining control voltage to said control grid of said traveling wave tube transmission means for the duration of said output signal.

2. In a high speed microwave transmitter apparatus having pulser delay times in the nanosecond range, a high speed pulser apparatus as described in claim 1 further including a diode chain means connected between said control grid of said traveling wave transmission means and R.F. ground for protecting said traveling wave tube transmission during positive going arc transients.

3. In a high speed microwave transmitter apparatus having pulser delay times in the nanosecond range, a high speed pulser apparatus as described in claim 1 further including a spark gap means connected between said control grid of said traveling wave tube transmission means and R.F. ground to provide a discharge path from said diode chain means for power follow through conditions.

4. In a high speed microwave transmitter apparatus having pulser delay times in the nanosecond range, a high speed pulser apparatus as described in claim 1 wherein the time delay between receipt of said low level positive pulse input signal and said turning on of said traveling wave tube transmission means is in the nanosecond range.

5. In a high speed microwave transmitter apparatus having pulser delay times in the nanosecond range, a high speed pulser apparatus as described in claim 1 wherein said compound emitter follower comprises a pair of complementary transistors and a coupling means at its output.

6. In a high speed microwave transmitter apparatus having pulser delay times in the nanosecond range, a high speed pulser apparatus as described in claim 5 wherein said coupling means comprises a special wideband toroidal video one to one coupler having a ground to deck capacitance of 2 micro-micro farads.

* * * * *